H. GUDERJAHN.
DIRIGIBLE HEADLIGHT FOR VEHICLES.
APPLICATION FILED MAY 23, 1913.

1,087,760.

Patented Feb. 17, 1914.
2 SHEETS—SHEET 1.

Witnesses
Frederick L. Fox.
V. B. Hillyard.

Inventor
Henry Guderjahn.
By Victor J. Evans
Attorney

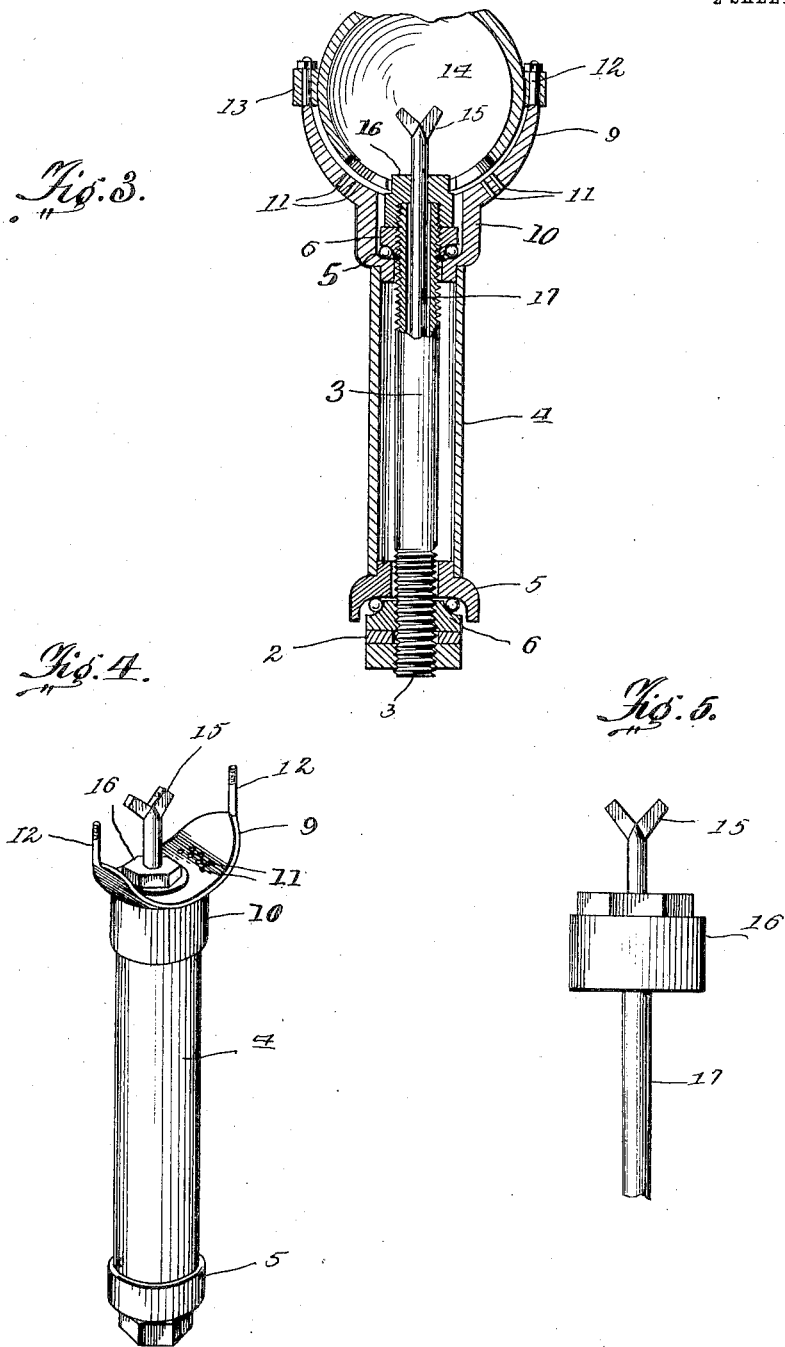

UNITED STATES PATENT OFFICE.

HENRY GUDERJAHN, OF WESTFIELD, WISCONSIN.

DIRIGIBLE HEADLIGHT FOR VEHICLES.

1,087,760.     Specification of Letters Patent.     Patented Feb. 17, 1914.

Application filed May 23, 1913. Serial No. 769,484.

*To all whom it may concern:*

Be it known that I, HENRY GUDERJAHN, a citizen of the United States, residing at Westfield, in the county of Marquette and State of Wisconsin, have invented new and useful Improvements in Dirigible Headlights for Vehicles, of which the following is a specification.

The invention relates to headlights for automobiles and like mechanically propelled vehicles, the purpose being the provision of headlights which are mounted and connected with the steering mechanism so as to move with the steering wheels and throw the light in the path of the machine whether turning a corner, rounding a curve or going straight ahead so that an obstruction or depression in the path of the vehicle may be observed in time to prevent a fatality.

The invention provides novel mountings for the lamps, whereby the same may turn with the least resistance, thereby preventing the imposition of additional work upon the steering mechanism or rendering the steering of the machine more difficult.

The invention consists of the novel features, details of construction and combination of parts, which hereinafter will be more particularly set forth, illustrated in the accompanying drawings, and pointed out in the appended claims.

Figure 1:
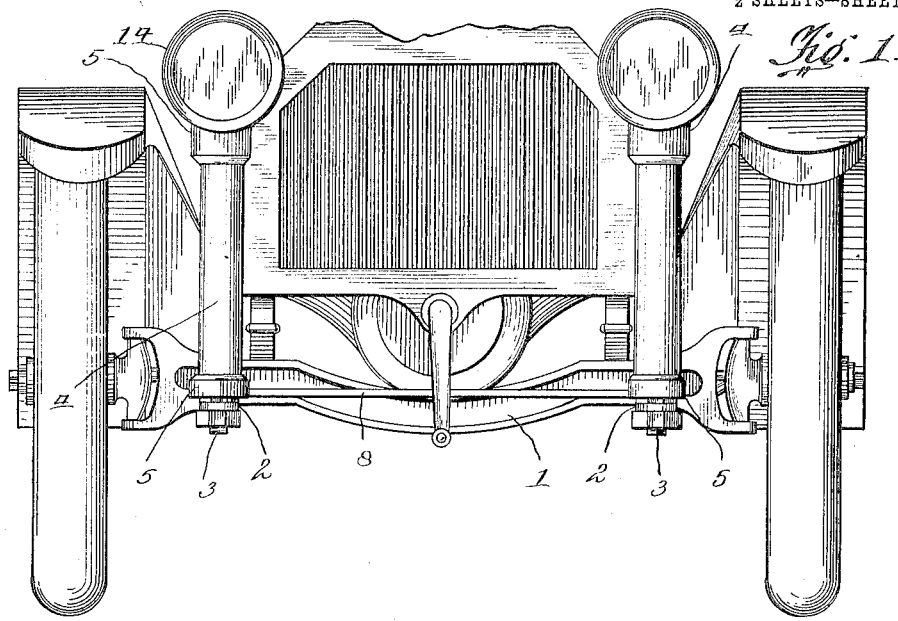
Figure 2:
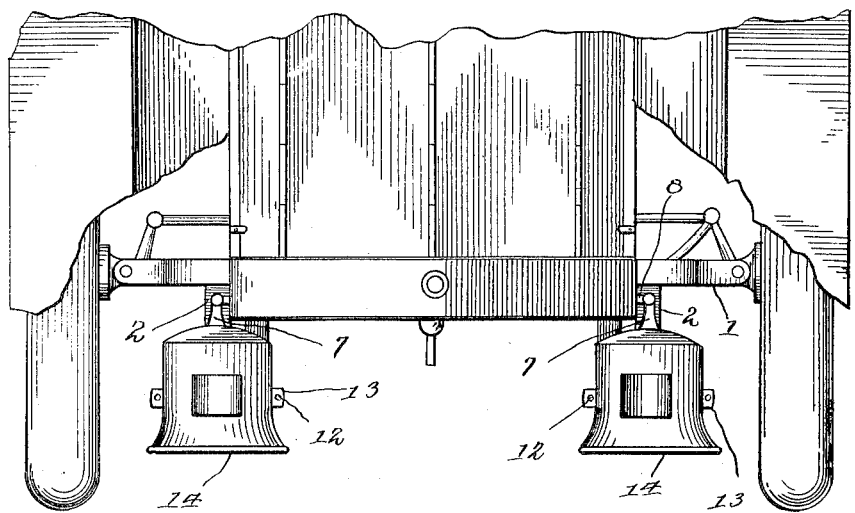

Referring to the drawings, forming a part of the specification, Figure 1 is a front view of an automobile provided with headlights embodying the invention. Fig. 2 is a top plan view. Fig. 3 is a vertical central section of a lamp post and lamp, showing the parts on a larger scale. Fig. 4 is a perspective view of a lamp post with the lamp removed. Fig. 5 is a detail view of the burner and supporting cap.

Corresponding and like parts are referred to in the following description, and indicated in all the views of the drawings, by the same reference characters.

The numeral 1 designates the front axle of a vehicle, such as an automobile truck or like machine, said axle being provided at its ends with knuckle yokes to which the wheel supporting spindles are connected by means of knuckles in any well known manner. Brackets 2 are secured to end portions of the axle 1 and receive hollow standards 3, which are clamped at their lower ends thereto. Lamp posts 4 are mounted upon the standards 3 and are provided near their upper and lower ends with cups 5 which receive cones 6, the latter being threaded upon the standards 3, balls being interposed between the cups and cones to provide antifriction bearings between the lamp posts and standards so that the lamps may turn with the least possible resistance. Arms 7 project from the cups 5 and are connected by means of a rod 8 to cause both lamp posts and lamps to turn in unison. A lamp base is secured to the upper end of each post 4 and comprises a flange 9 and a collar 10. The flange 9 is provided at opposite points with a plurality of openings 11 for the ingress of air to support combustion when the lamp is burning. Fingers 12 project upwardly from opposite ends of the flange 9 and are adapted to pass through openings formed in the lugs 13 at the sides of the lamp body 14, the upper ends of the fingers 12 being threaded to receive nuts, whereby the lamp body is confined to the lamp base. The construction is such as to admit of the lamp body being readily removed from the lamp post at any time when required.

The burner 15 is attached to a cap 16, which is threaded upon the upper end of a standard 3. In the event of the burner being of the gas type the tube 17 supplying gas thereto extends through the hollow standard 3. If the burner is of the electric type the wires leading the electric fluid thereto are adapted to pass through the hollow standards 3. The construction is such as to conceal and protect the means for conveying the light producing medium to the burners.

When equipping a vehicle with headlights embodying the invention the brackets 2 may be secured to any convenient part of the chassis or running gear and the rod 8 may be connected in any manner with the steering mechanism so as to move therewith and insure the lamps following the movement of the steering wheels, with the result of throwing the light in the path of the machine whether the same is turning a corner or going straight ahead. Should it be required to remove the lamp body from the lamp post the result may be readily effected by means of the construction disclosed.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. In a vehicle headlight, the combination of a fixed standard, a burner at the upper end of the standard, a hollow post receiving such standard and rotatable thereon, antifriction bearings between the hollow post and standard and a lamp body at the upper end of the hollow post to receive the burner.

2. In a vehicle headlight, the combination of a fixed standard provided at its upper end with a burner, cones at the opposite ends of the standards, a hollow post receiving the standard and rotatable thereon, cups at the ends of the hollow post arranged to receive the cones at the ends of the standards, balls between the cones and cups and a lamp body at the upper end of the hollow post to receive the burner.

3. In a vehicle headlight, the combination of a bracket, a standard secured to such bracket, a lamp post mounted upon the standard to turn thereon, antifriction bearings between the lamp post and standard, a burner secured to the upper end of the standard, a lamp base at the upper end of the post, and a lamp body secured to the lamp base and receiving the burner.

In testimony whereof I affix my signature in presence of two witnesses.

HENRY GUDERJAHN.

Witnesses:
THEODORE BERTIN,
JOHN R. SWANLAW.